Sept. 22, 1953     W. J. MORROW     2,652,743
OPTICAL APPARATUS FOR MEASURING TEMPERATURE
Filed Jan. 20, 1950
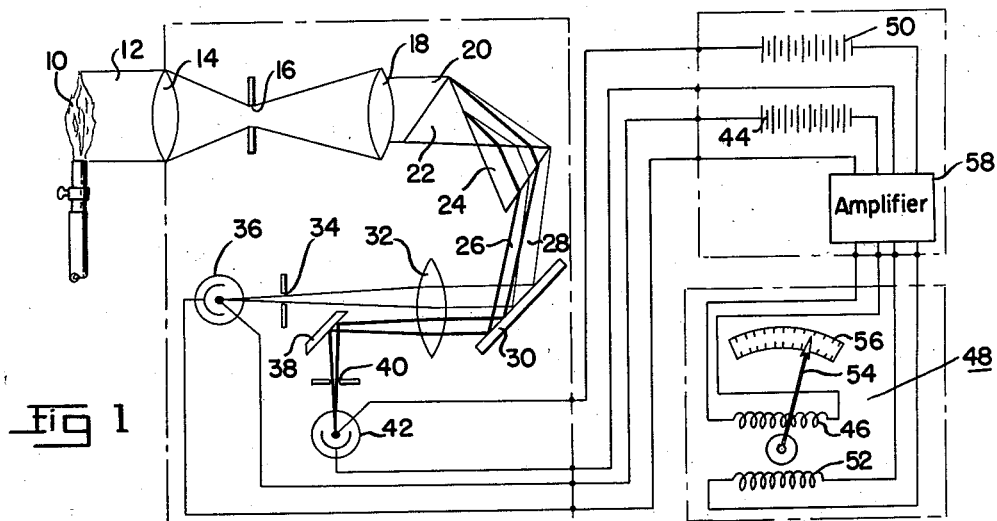
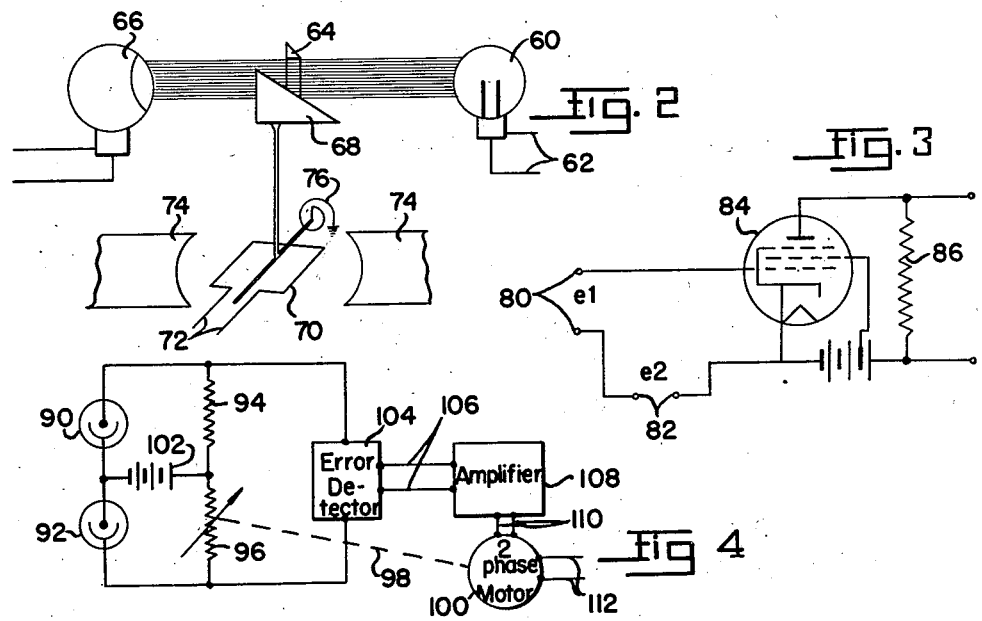
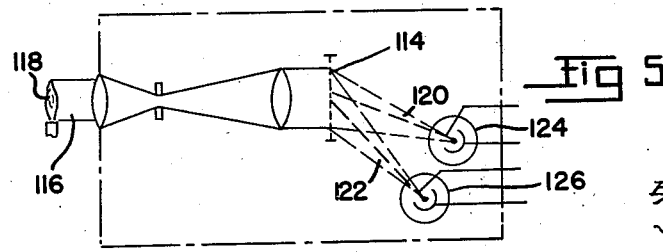
*INVENTOR*
WILLIAM J. MORROW
By
Toulmin & Toulmin
ATTORNEYS.

Patented Sept. 22, 1953

2,652,743

UNITED STATES PATENT OFFICE 2,652,743

OPTICAL APPARATUS FOR MEASURING TEMPERATURE

William J. Morrow, Dayton, Ohio

Application January 20, 1950, Serial No. 139,694

2 Claims. (Cl. 88—22.5)

This invention relates to a method and apparatus for measuring temperatures and refers particularly to a method and apparatus for instantaneously detecting and measuring the temperature of a continuous radiator, such as an incandescent solid or a luminous gas flame.

In many industrial processes and in the laboratory, there are temperatures which must be maintained within predetermined close limits. Many times these temperatures, as in the case of a blast furnace, or with luminous flames, can be measured optically and the temperatures determined by a measurement of the intensity of a given wave length of the radiation.

A number of radiation pyrometers of this nature are available, but all have certain inherent shortcomings which materially restrict their utility. One of the most serious shortcomings of pyrometers of this nature that are presently available is that they are relatively slow, and for this reason introduce a substantial delay between the existence of an off-temperature condition and the institution of a correction for this condition.

Obviously, many processes could be considerably refined if the critical temperature which it was desired to control could be instantaneously and continuously measured and indicated.

A number of other temperature measuring devices are also in existence, utilizing thermocouples, total radiation methods, two-wire methods, and methods employing the addition of luminous substances to the flame for producing a certain type of radiation, but all of these methods are far too slow and laborious to meet the requirements of a rapidly operating temperature measuring device suitable for industrial and laboratory use.

Having the foregoing in mind, the particular object of the present invention is the provision of a pyrometer which overcomes the objections referred to.

A particular object of this invention is to provide a pyrometer which will give an instantaneous indication of the temperature being measured.

A still further object of this invention is the provision of a pyrometer which is very compact and which can therefore be readily transported and used.

A still further object is the provision of a pyrometer which can be calibrated directly in temperatures, thereby avoiding laborious and slow conversion operations and the chance of introducing errors during conversion.

Another object of this invention is the provision of a pyrometer which will give an accurate reading for all temperatures from the lowest which produce detectable radiation to the highest.

These and other objects and advantages will become more apparent upon reference to the following description taken in connection with the accompanying drawings, in which:

Figure 1 is a diagrammatic view of a pyrometer constructed according to my invention;

Figure 2 is a fragmentary view showing a modified arrangement for converting the detected stimuli into a visual indication of the temperature producing the stimuli;

Figure 3 illustrates still another modified form for converting the detected stimuli into an impulse that can be indicated on an instrument;

Figure 4 shows a still further arrangement wherein a self-balancing bridge is employed for giving a visual indication of the detected stimuli; and Figure 5 is a view showing a modified arrangement for splitting the beam of radiation which the pyrometer receives from the source of the radiation being measured.

General discussion

The pyrometer of this invention operates on the basis of Wien's Law which applies to radiant energy of the visible wave lengths. The instrument is, accordingly, useful for measuring the temperature of any luminous, continuous radiator, such as a hydrocarbon flame, a blast furnace wall, incandescent metals, either molten or solid, or any other incandescent material.

The range of useful operation of the instrument would commence at about 1000 degrees Fahrenheit, at which point radiation becomes visible, upwardly with no apparent maximum.

The manner in which the above-mentioned Wien's Law is applied is set forth as follows:

(1) $$I = C_1 \lambda^{-5} (e)^{\frac{-C_2}{\lambda T}}$$

Where

I—intensity of radiation at wave length $\lambda$
$C_1$ and $C_2$—known constants
$\lambda$—monochromatic wave length
$e$—base of natural logarithms
T—absolute black body temperature For a non-black body a correction factor known as a coefficient of emissivity (E) must be introduced. Therefore:

(2) $$I = E_\lambda C_1 \lambda^{-5} (e)^{\frac{-C_2}{\lambda T}}$$

It is known that value of $E_\lambda$ is a function of the wave length and the body, but that for a given wave length and body it is a constant.

Writing Equation 2 for two separate wave lengths and dividing one equation by the other, the following expression is obtained:

(3) $$\frac{I_1}{I_2}=\frac{E_{\lambda 1}C_1\lambda_1^{-5}(e)^{\frac{-C_2}{\lambda_1 T}}}{E_{\lambda 2}C_1\lambda_2^{-5}(e)^{\frac{-C_2}{\lambda_2 T}}}$$

By taking the natural log of both sides of the equation, canceling the $C_1$ terms and remembering that the $\ln e = 1$, the following expression is obtained:

(4) $$\ln\left(\frac{I_1}{I_2}\times\frac{E_{\lambda 2}}{E_{\lambda 1}}\times\frac{\lambda_2^{-5}}{\lambda_1^{-5}}\right)=\frac{C_2}{T}\left(\frac{1}{\lambda_2}-\frac{1}{\lambda_1}\right)$$

Solving for T the following equation is obtained:

(5) $$T=\frac{C_2\left(\frac{1}{\lambda_2}-\frac{1}{\lambda_1}\right)}{\ln\left(\frac{I_1}{I_2}\times\frac{E_{\lambda 2}}{E_{\lambda 1}}\times\frac{\lambda_2^{-5}}{\lambda_1^{-5}}\right)}$$

Since for two definite wave lengths all terms in 5 are constants except for T, $I_1$, and $I_2$, Equation 5 could be simplified to:

(6) $$T=\frac{A}{\left(\ln\frac{I_1}{I_2}\right)+B}$$

Where A and B are new constants formed by grouping together the constants in 5.

From 6 it is readily seen that the absolute temperature of a luminous body can be determined from the ratio of the intensity of radiation at two different wave lengths.

From the foregoing development of the application of Wien's Law to the measurement of temperature, it will be apparent that determining the ratio of the intensities of two different wave lengths of radiation has the definite advantage of eliminating a number of errors in variables, which will result in more accurate readings.

The instrument of the instant invention is predicated on this principle, and as the following description proceeds, it will be evident that in operation the instrument first divides the radiation from the body or gas being measured into different wave lengths, then detects the intensities of the radiations, and then measures the ratio of the said intensities.

According to this invention, a single beam of radiation is received from the radiator, and this single beam is separated to provide the two stimuli to be detected. By receiving only a single beam from a radiator, rather than two beams, all errors that would be introduced by viewing the radiator from different angles, as would be necessary to receive two beams, are completely eliminated, and an exact indication of the temperature being measured thereby results.

*Structural arrangement*

Turning now to the drawings, there is diagrammatically illustrated in Figure 1 the preferred form which the pyrometric instrument of this invention takes. The radiator is indicated at 10, and while it is shown as a gas flame, it will be understood that it could be any of the radiators referred to previously, either gaseous, liquid, or solid.

A beam of radiation 12 from the radiator is passed through the condensing lens 14 and focused thereby on a slit 16. Slit 16 forms the objective for another lens 18, and the light falling on lens 18 from slit 16 is collimated by the said lens and emerges therefrom as the parallel beam 20.

Beam 20 falls on the face of a prism 22 and emerges from another face thereof as parallel but refracted light. Preferably, a second prism 24 is arranged to receive the light from prism 22 in order further to resolve the original light beam into two component beams of different wave lengths. As illustrated in the drawings, the light issuing from prism 24 consists of a first beam 26, principally of one wave length, and a second beam 28, principally of a different wave length.

The beams 26 and 28 fall on a mirror 30, preferably front silvered, and after being reflected therefrom are focused by a lens 32. The beam 28 is focused by lens 32 on slit 34 and photocell 36, whereas beam 26 falls first on mirror 38, preferably front silvered, and then passes through slit 40 to photocell 42.

Photocell 36 is connected in circuit with a battery 44 and one coil 46 of a ratiometer 48. Similarly, photocell 42 is connected in circuit with a battery 50 and another coil 52 of the said ratiometer. The ratiometer includes movable parts having a pointer 54 sweeping over a calibrated dial 56.

It will be understood that coils 46 and 52 could be mounted on the moving element of the ratiometer, or could be stationary in the field of the ratiometer, with the moving element consisting of a soft iron vane or the like. In any case, the ratiometer will serve to indicate the ratios of the electric currents flowing through the photocells 36 and 42 due to their illumination by the light beams 26 and 28.

As explained previously, the measurement of this ratio gives an indication of the temperature of radiator 10 when the scale 56 of the ratiometer is calibrated in accordance with Formula 6 above.

Due to the fact that the radiation received by the instrument is quite small, I have found it preferable to employ multiplier-type photocells at 36 and 42 in accordance with well known practices in the art.

Such multiplier photocells of the type identified by the number 1P22 have been found satisfactory, and the circuit employed with a tube of this nature can readily be found in the manufacturer's literature.

In most cases it is also preferable to amplify the photocell outputs, as diagrammatically indicated by amplifier 58 in Figure 1. Substantially any of the well known amplifying arrangements may be employed at 58, but I have found it preferable to utilize the cathode follower type of amplifier, and which is characterized by a very low degree of distortion, thereby insuring that the amplification of the detected stimulus will not result in any appreciable error in the indication of the ratiometer.

In Figure 2 I have illustrated schematically an electromechanical arrangement for indicating the ratio of the photocell currents. In Figure 2 there is a glow lamp at 60 which is energized through wires 62 by the output of one of the photocell circuits. The light from the glow lamp passes through a slit 64 to fall on a photocell 66. Slit 64 is adapted for being variably masked by a flag 68 mounted to move with a coil 70 that is connected by wires 72 with the output from the other of the photocell circuits.

Coil 70 may advantageously move in a field established by the permanent magnet arrangement 74 and a restoring spring 76 gives the coil a permanent bias in one direction.

In operation the light produced by the glow tube 60 is proportionate to the output of the one photocell circuit, and the position occupied by flag 68 is an indication of the output of the other photocell circuit. The amount of light falling on photocell 66 is, therefore, a function of both of the photocell circuit outputs and represents the ratio or product of these outputs. The output from the photocell 66 can, of course, be converted into an indication by any standard indicating instrument of any suitable type.

In connection with the arrangement of Figure 2, it has been shown that the source of light from the glow lamp varies with the one photocell output and the masking off of the light varies with the other photocell output. However, a still further arrangement employing substantially the same principles can be arrived at by projecting a constant source of illumination toward photocell 66 and adjusting the position of the mask by a dynamometer type instrument, wherein the movable coil is energized from one of the detecting photocell circuits, and the field in which the coil moves is established by a coil energized from the other of the detector photocell circuits.

In Figure 3 I have illustrated how an electronic circuit can be employed to arrive at the ratio of the outputs of the detector photocells. In Figure 3, the voltage $e_1$ from one of the photocell circuits is applied across terminals 80, while voltage $e_2$ from the other of the detector photocell circuits is applied across the terminals 82.

It will be evident that the conductance of the tube 84 is varied by the voltages applied across the abovementioned terminals, and that the voltage across output resister 86 is a measure of the ratio or product of the detector photocell outputs. The circuit of Figure 3 has the advantage of consuming very little current so the operation of the detector photocells and their circuits is substantially static, thereby eliminating variables introduced by current flow.

In Figure 4 I have illustrated a self-balancing bridge arrangement of a substantially conventional type in which the detector photocells are indicated at 90 and 92 and are connected in circuit with resistors 94 and 96, the latter of which is variable as by means of its connection 98 with the two-phase motor 100.

A battery 102 completes the photocell circuits so that upon stimulation of the photocells by the beams from the radiator, current will flow in the resistors 94 and 96.

Connected across the resistors is the error detector 104 which, when there is an unbalance in the currents through resistors 94 and 96, supplies an impulse through wires 106 to an amplifier 108. Amplifier 108, in turn, supplies the impulse in amplified form from wires 110 to motor 100. The impulse supplied from wires 110, in combination with the supply of energy from wires 112 to the two-phase motor, causes the motor to run in a direction to adjust the setting of resister 96 through the connection 98 of the resister with the motor, so as to bring the bridge back into balance. The position of the slider or the position of a member driven by motor 100 will, accordingly, indicate the point at which the bridge becomes balanced, and, therefore, the temperature of the radiator which is stimulating cells 90 and 92.

A somewhat similar bridge arrangement can be arrived at by amplifying the unbalance existing in the bridge through a suitable electronic tube arrangement without attempting to balance the bridge and utilizing the amplified current of unbalance to energize a galvanometer movement of a suitable type.

In Figure 5 I have illustrated how a defraction grating at 114 can be utilized for splitting a light beam 116 from a radiator 118 into its component parts of different wave lengths, as at 120 and 122, for stimulating the detector photocells 124 and 126, the outputs of which can be treated in any of the manners described above for obtaining an indication of the ratio of the respective photocell currents.

From the foregoing, it will be apparent that what I have devised is an improved pyrometric instrument which will give instantaneous and continuous indications of the true temperature of a luminous radiator. A single beam from the radiator is effective for actuating the instrument, and the instrument includes means for splitting the beam into components of different wave lengths and for detecting and measuring the ratio of the intensities of the different components.

The instrument according to this invention requires no contact with the radiator being measured, eliminates the need for any probes extended into a flame or molten body, and has no apparent limits within the range of luminosity of radiators from the lowest temperature to the highest.

It will be understood that I do not wish to be limited to the exact proportions, ratios, and other factors specifically set forth in the foregoing description and the accompanying drawings, but desire to comprehend such changes thereof as may be further desirable to adapt my invention to different conditions and usages.

I claim:

1. In a radiation pyrometer: an objective lens system for receiving a single beam of radiation from a source of temperature subject to rapid fluctuations which are to be measured, means forming a slit on which the lens system focuses the beam, a pair of photoelectric detector means, means including prisms interposed between the slit and the detector means to disperse the received beam into two separate beams of spaced wave-lengths and to focus the separate beams on their respective detector means, a collimating lens between the slit and the prism for collecting the radiation from the slit and directing it as parallel rays to the prism, and a ratiometer for continuously measuring and indicating the ratio of the impulses from said detector means, said ratiometer having an indicating arm and two separate coils for influencing the movement of said arm, said coils having their magnetic fields in direct opposition, one of the coils being connected in an electrical circuit with one of the detector means, and the other coil being connected in an electrical circuit with the other detector means, each of said coils responding to its respective detector means to move said arm whereby the position of said arm continuously indicates the temperature of said source irrespective of any fluctuations thereof.

2. In a radiation pyrometer: an objective lens means to receive a beam of radiation from a temperature source subject to rapid fluctuations, means forming a slit on which the lens focuses the beam, prism means for splitting a beam of parallel rays into two separate beams, the wavelengths of each of said beams being different and spaced substantially from each other, a collimating lens to collect radiation from the slit and direct it as parallel rays to said prism means, a pair of photocell detectors upon which said separate beams respectively fall upon leaving the prism means, and means for continually measuring the instantaneous ratio of the outputs of said detectors to determine the temperature of said source, each of said detectors comprising multiplier type photocells, said measuring means comprising a ratiometer having a movable indicating arm and a pair of coils to control the said arm having their magnetic fields in opposition, and each coil being connected to a different one of said detectors to move said arm whereby the position of said arm continuously indicates the temperature of said source irrespective of any fluctuations thereof.

WILLIAM J. MORROW.

References Cited in the file of this patent

UNITED STATES PATENTS

| Number | Name | Date |
| --- | --- | --- |
| 2,166,824 | Runaldue | July 18, 1939 |
| 2,203,036 | Briessen et al. | June 4, 1940 |
| 2,218,253 | Weaver | Oct. 15, 1940 |
| 2,237,713 | Russell | Apr. 8, 1941 |
| 2,302,554 | Kingsbury | Nov. 17, 1942 |
| 2,402,719 | Allison | June 25, 1946 |
| 2,408,023 | Kruper | Sept. 24, 1946 |
| 2,436,104 | Fisher et al. | Feb. 17, 1948 |